(12) United States Patent
Yamamoto et al.

(10) Patent No.: US 9,758,158 B2
(45) Date of Patent: Sep. 12, 2017

(54) HYBRID VEHICLE CONTROL DEVICE

(71) Applicant: Nissan Motor Co., Ltd., Yokohama-shi, Kanagawa (JP)

(72) Inventors: Akihiro Yamamoto, Hiratsuka (JP); Morihiro Nagamine, Kanagawa (JP); Akira Takano, Kanagawa (JP); Shintaro Oshio, Kanagawa (JP); Yoshihisa Kodama, Sagamihara (JP); Takuro Hirano, Gotemba (JP); Yukifumi Otsuka, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/121,797

(22) PCT Filed: Jan. 28, 2015

(86) PCT No.: PCT/JP2015/052329
§ 371 (c)(1),
(2) Date: Aug. 26, 2016

(87) PCT Pub. No.: WO2015/141285
PCT Pub. Date: Sep. 24, 2015

(65) Prior Publication Data
US 2017/0015301 A1    Jan. 19, 2017

(30) Foreign Application Priority Data

Mar. 20, 2014   (JP) ................................. 2014-057584

(51) Int. Cl.
*B60K 6/543*    (2007.10)
*B60W 10/06*    (2006.01)
(Continued)

(52) U.S. Cl.
CPC ............... *B60W 20/20* (2013.01); *B60K 6/38* (2013.01); *B60K 6/442* (2013.01); *B60K 6/48* (2013.01);
(Continued)

(58) Field of Classification Search
None
See application file for complete search history.

(56) References Cited

U.S. PATENT DOCUMENTS

| 6,346,062 B1 | 2/2002 | Shimabukuro et al. |
| 2005/0090962 A1* | 4/2005 | Ota ........................ F16H 3/663 701/51 |

(Continued)

FOREIGN PATENT DOCUMENTS

| CN | 101242979 A | 8/2008 |
| CN | 102211578 A | 10/2011 |

(Continued)

*Primary Examiner* — Jerrah Edwards
*Assistant Examiner* — Paul Castro
(74) *Attorney, Agent, or Firm* — Global IP Counselors, LLP

(57) ABSTRACT

A hybrid vehicle control device is provided with at least one controller that controls the outputs of the engine and of the motor according to the driving state, the engagement and disengagement of the clutch, and the transmission ratio of the continuously variable transmission. The at least one controller is programmed to start the engine and forcibly downshift the continuously variable transmission to a transmission ratio with which it is possible to start on an uphill road upon determining that the vehicle is on an uphill road while in an electric vehicle mode in which it is possible to travel by the drive force of the motor with the clutch released and the engine stopped.

8 Claims, 6 Drawing Sheets

(51) Int. Cl.
  *B60K 6/442* (2007.10)
  *B60W 20/20* (2016.01)
  *B60K 6/48* (2007.10)
  *B60W 10/02* (2006.01)
  *B60W 20/00* (2016.01)
  *B60W 10/08* (2006.01)
  *B60W 10/107* (2012.01)
  *B60W 30/18* (2012.01)
  *B60K 6/38* (2007.10)
  *B60W 10/101* (2012.01)
  *B60W 20/30* (2016.01)

(52) U.S. Cl.
  CPC ............ *B60K 6/543* (2013.01); *B60W 10/02* (2013.01); *B60W 10/06* (2013.01); *B60W 10/08* (2013.01); *B60W 10/101* (2013.01); *B60W 10/107* (2013.01); *B60W 20/00* (2013.01); *B60W 20/30* (2013.01); *B60W 30/18027* (2013.01); *B60K 2006/4808* (2013.01); *B60W 2550/142* (2013.01); *B60W 2710/06* (2013.01); *B60W 2710/1005* (2013.01); *B60Y 2200/92* (2013.01); *B60Y 2300/181* (2013.01); *B60Y 2300/182* (2013.01); *B60Y 2300/42* (2013.01); *B60Y 2300/43* (2013.01); *B60Y 2300/60* (2013.01); *B60Y 2300/70* (2013.01); *B60Y 2400/72* (2013.01); *Y02T 10/626* (2013.01); *Y02T 10/6221* (2013.01); *Y02T 10/6286* (2013.01); *Y10S 903/912* (2013.01); *Y10S 903/918* (2013.01)

(56) References Cited

U.S. PATENT DOCUMENTS

2008/0090690 A1* 4/2008 Lee .................... F16H 3/76
                                                                475/207
2013/0274976 A1* 10/2013 Suzuki .................. B60K 6/48
                                                                701/22

FOREIGN PATENT DOCUMENTS

| JP | 11-178113 A     | 7/1999  |
| JP | 2000-199442 A   | 7/2000  |
| JP | 2006-248371 A   | 9/2006  |
| JP | 2007-1392 A     | 1/2007  |
| JP | 2007-278367 A   | 10/2007 |
| JP | 2013-86649 A    | 5/2013  |
| JP | 2015-134508 A   | 7/2015  |
| WO | 2013/058139 A1  | 4/2013  |
| WO | 2013/146175 A1  | 10/2013 |

* cited by examiner

| | L/B | H/C | R/B |
|---|---|---|---|
| 1ST SPEED | O | × | × |
| 2ND SPEED | × | O | × |
| REVERSE | × | × | O |
| NEUTRAL | × | × | × |

HYBRID VEHICLE CONTROL DEVICE

CROSS-REFERENCE TO RELATED APPLICATIONS

This application is a U.S. National stage application of International Application No. PCT/JP2015/052329, filed Jan. 28, 2015. This application claims right of priority based on Japanese Patent Application No. 2014-057584 filed to the Japan Patent Office on Mar. 20, 2014, and the disclosure of which is hereby entirely incorporated herein by reference.

BACKGROUND

Field of the Invention

The present invention generally relates to a control device for a hybrid vehicle equipped with an engine and an electric motor as power sources, and that is capable of selecting between an electric travel mode (EV mode) for travel executed only by the electric motor and a hybrid travel mode (HEV mode) for travel executed by the electric motor and the engine.

Background Information

For example, a hybrid vehicle such as that disclosed in Japanese Laid-Open Patent Application No. 2000-199442 is known. In this hybrid vehicle, the engine is detachably coupled to a driving wheel sequentially via a continuously variable transmission and a clutch, and an electric motor is constantly coupled to the driving wheel. The hybrid vehicle further comprises a mechanical oil pump that is driven by the engine and that supplies oil to the continuously variable transmission and the clutch.

This hybrid vehicle is capable of electric travel (EV travel) in the EV mode by only the electric motor by stopping the engine as well as releasing the clutch described above, and is capable of hybrid travel (HEV travel) in the HEV mode by the electric motor and the engine by starting the engine as well as engaging the clutch.

Since the engine in a stopped state and the continuously variable transmission are disconnected from the drive wheel by releasing the clutch during EV travel, the friction of the engine and the continuously variable transmission can be reduced during EV travel, and by avoiding corresponding energy loss, it is possible to increase the energy efficiency.

SUMMARY

However, in the above-described prior art, there is still reason to consider how to control the transmission ratio of the continuously variable transmission, after switching from the HEV mode to the EV mode.

That is, in the prior art described above, a transmission ratio control of the continuously variable transmission is not at all carried out during the EV mode; therefore, if the vehicle is stopped with a High-side transmission ratio, it is difficult to ensure the starting performance. For example, when stopping the vehicle on an uphill road while maintaining a High-side transmission ratio and the vehicle is started thereafter, there is the problem that, even if the engine torque is used in the HEV mode, if the torque that is transmitted to the drive wheel is reduced by being shifted to the High side and falls below the gradient resistance, an uphill start cannot be carried out.

In view of the problem described above, an object of the present invention is to provide a hybrid vehicle control device that is capable of stable travel on an uphill road.

For this purpose, in the hybrid vehicle control device according to the present invention, provided with a control means that controls the outputs of the engine and of the motor according to the driving state, the engagement and disengagement of the clutch, and the transmission ratio of the continuously variable transmission, when it is determined that the vehicle is on an uphill road while in an electric vehicle mode in which it is possible to travel by the drive force of the motor with the clutch released and the engine stopped, the engine is started and the continuously variable transmission is forcibly downshifted to a transmission ratio with which it is possible to start on an uphill road.

Therefore, even when the vehicle is switched to a mode in which the engine is used to travel on an uphill road while in the electric vehicle mode, since the transmission ratio of the continuously variable transmission is downshifted to a transmission ratio with which it is possible to start on an uphill road, it becomes possible to sufficiently transmit the drive force of the engine to the drive wheel and to travel stably.

BRIEF DESCRIPTION OF THE DRAWINGS

Figure 1:
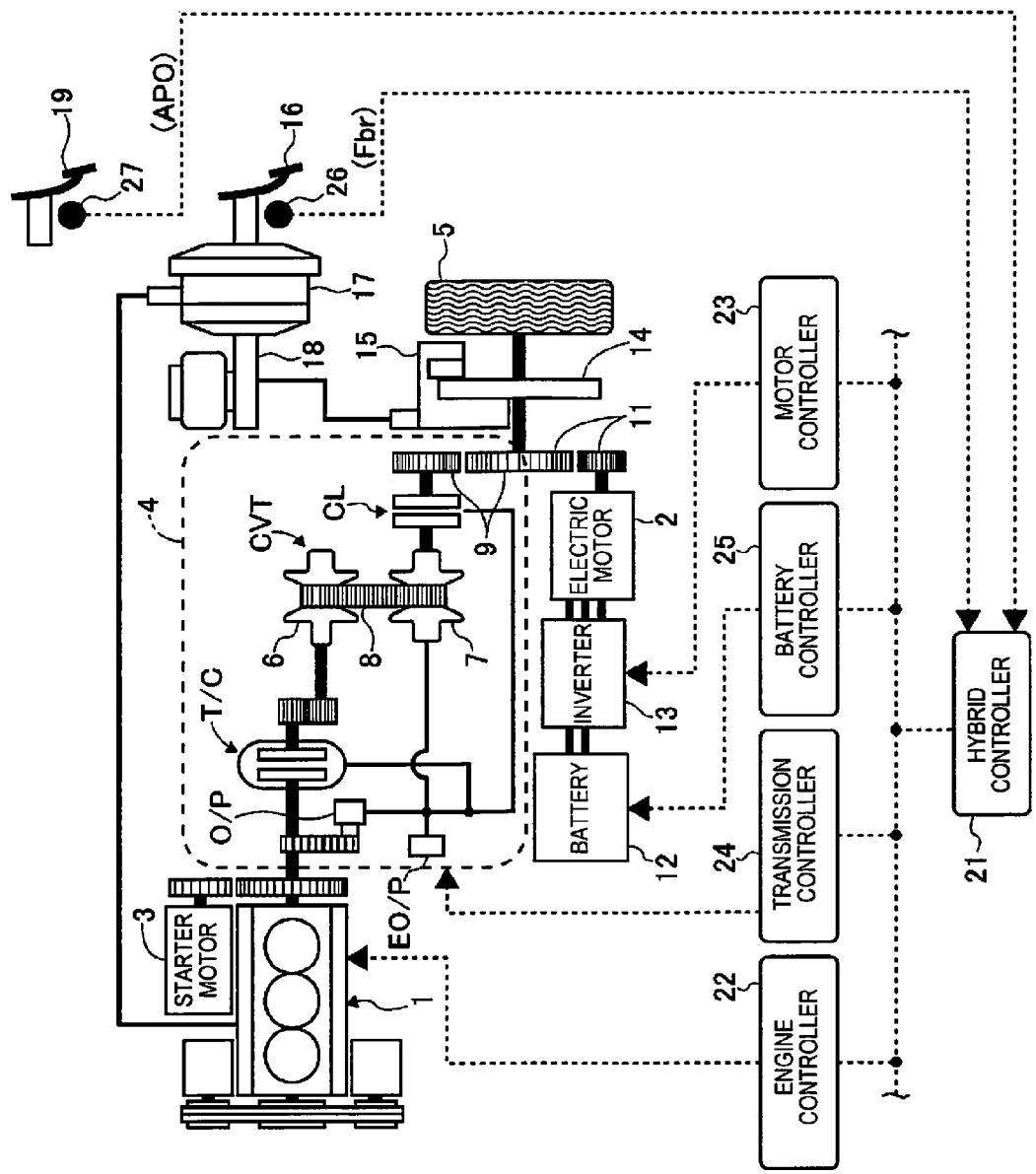
FIG. 1 is a schematic system view illustrating a drive system of a hybrid vehicle and an overall control system thereof in accordance with a first embodiment.

A preferred embodiment for realizing a hybrid vehicle control device of the present invention is described below based on the first embodiment illustrated in the drawings.

First Embodiment

FIG. 1 is a schematic system view illustrating the drive system of the hybrid vehicle and the overall control system thereof of the first embodiment. The hybrid vehicle of FIG. 1 is equipped with an engine 1 and an electric motor 2 as power sources, and the engine 1 is started by a starter motor 3. The engine 1 is drivably coupled to a drive wheel 5 so as to be appropriately detachable via a V-belt type continuously variable transmission 4.

The variator CVT of the continuously variable transmission 4 is a V-belt type continuously variable transmission comprising a primary pulley 6, a secondary pulley 7, and a V-belt 8 (endless flexible member) that is bridged between these pulleys 6, 7. A configuration to bundle a plurality of elements by an endless belt was employed for the V-belt 8, but the configuration is not particularly limited thereto; for example, the chain method or the like may be employed. The primary pulley 6 is coupled to a crankshaft of the engine 1 via a torque converter T/C, and the secondary pulley 7 is sequentially coupled to the drive wheel 5 via a clutch CL and a final gear set 9. In the present embodiment, elements for connecting/disconnecting the power transmission path (clutches, brakes, etc.) are collectively described as the clutch. FIG. 1 conceptually illustrates the power transmission path; the high clutch H/C, the reverse brake R/B, and the low brake L/B provided in the sub-transmission 31 described further below are collectively described as the clutch CL. When the clutch CL is engaged, power from the engine 1 is input to the primary pulley 6 via the torque converter T/C, and reaches the drive wheel 5 via the V-belt 8, the secondary pulley 7, the clutch CL, and the final gear set 9 in that order, and is used for running the hybrid vehicle.

During engine power transmission, the winding arc diameter of the V-belt 8 with the primary pulley 6 is increased at the same time that the winding arc diameter with the secondary pulley 7 is decreased by decreasing the pulley V-groove width of the primary pulley 6 and increasing the pulley V-groove width of the secondary pulley 7. The variator CVT thereby carries out an upshift to the High-side pulley ratio (High-side transmission ratio). When the upshift to the High-side transmission ratio is carried out to the limit, the transmission ratio is set to the maximum transmission ratio.

Conversely, the winding arc diameter of the V-belt 8 with the primary pulley 6 is decreased at the same time that the winding arc diameter with the secondary pulley 7 is increased by increasing the pulley V-groove width of the primary pulley 6 and decreasing the pulley V-groove width of the secondary pulley 7. The variator CVT thereby performs a downshift to the Low-side pulley ratio (Low-side transmission ratio). When the downshift to the Low-side transmission ratio is carried out to the limit, the transmission ratio is set to the minimum transmission ratio.

The variator CVT comprises a primary rotational speed sensor 6a for detecting the rotational speed of the primary pulley 6, and a secondary rotational speed sensor 7a for detecting the rotational speed of the secondary pulley 7 and calculates the actual transmission ratio based on the rotational speeds detected by these two rotational speed sensors; the hydraulic control, etc., of each pulley is performed so that this actual transmission ratio becomes the target transmission ratio.

An electric motor 2 is constantly coupled to the drive wheel 5 via a final gear set 11, and this electric motor 2 is driven by power from a battery 12 via an inverter 13. The inverter 13 provides power to the electric motor 2 after converting the DC power of the battery 12 to AC power, and controls the drive force and the rotational direction of the electric motor 2 by adjusting the power supplied to the electric motor 2. In addition to the motor driving described above, the electric motor 2 also functions as a generator, which is also provided for use in regenerative braking. During this regenerative braking, the inverter 13 causes the electric motor 2 to act as a generator by applying a generator load corresponding to the regenerative braking force to the electric motor 2, and stores the electric power generated by the electric motor 2 in the battery 12.

In the hybrid vehicle of the first embodiment, only the power of the electric motor 2 reaches the drive wheel 5 via the final gear set 11 by driving the electric motor 2 in a state in which the clutch CL is released and the engine 1 is stopped, to carry out travel in an electric travel mode (EV mode) executed only by the electric motor 2. During this time, friction from the engine 1, which is in a stopped state, and from the variator CVT are reduced, and wasteful power consumption during EV travel is suppressed, by releasing the clutch CL.

In the EV mode travel state described above, if the clutch CL is engaged at the same time as starting the engine 1 with the starter motor 3, the power from the engine 1 will reach the drive wheel 5 via the torque converter T/C, the primary pulley 6, the V-belt 8, the secondary pulley 7, the clutch CL, and the final gear set 9, in that order, and the hybrid vehicle will carry out travel in hybrid travel mode (HEV mode) executed by the engine 1 and the electric motor 2.

Stopping the hybrid vehicle from the above-described travel state or maintaining the stopped state is achieved by clamping and braking a brake disk 14, which rotates with the drive wheel 5, with a caliper 15. The caliper 15 is connected to a master cylinder 18 that outputs brake fluid pressure corresponding to the brake pedal stepping force under boost by a negative pressure type brake booster 17, in response to the stepping force of a brake pedal 16 which a driver steps on. Frictional braking of the brake disk 14 is carried out by actuating the caliper 15 with the brake fluid pressure that is generated by the master cylinder 18. In both the EV mode and the HEV mode, the wheel 5 is driven by a torque corresponding to a drive force command, which is issued by the driver by stepping on an accelerator pedal 19, and the hybrid vehicle is made to travel with a drive force corresponding to the needs of the driver.

The hybrid controller 21 executes a travel mode selection of the hybrid vehicle, the output control of the engine 1, the rotational direction control and the output control of the electric motor 2, the shift control of the variator CVT, the transmission control of the sub-transmission 31, the engagement and disengagement control of the clutch CL, and the charge/discharge control of the battery 12. At this time, the hybrid controller 21 carries out these controls via a corresponding engine controller 22, a motor controller 23, a transmission controller 24, and a battery controller 25.

A signal from a brake switch 26, which is a normally-off switch that is switched from OFF to ON when braking by stepping on the brake pedal 16, and a signal from an accelerator pedal opening amount sensor 27 that detects the accelerator pedal depression amount (accelerator pedal opening amount) APO are input to the hybrid controller 21. The hybrid controller 21 further exchanges internal information among the engine controller 22, the motor controller 23, the transmission controller 24, and the battery controller 25.

The engine controller 22 controls the output of the engine 1 in response to a command from the hybrid controller 21, and the motor controller 23 controls the rotational direction and the output of the electric motor 2 via the inverter 13 in response to a command from the hybrid controller 21 The transmission controller 24 carries out transmission control of the variator CVT (V-belt type continuously variable transmission CVT), the transmission control of the sub-transmission 31, and the engagement/disengagement of the clutch CL, with oil from an engine driven mechanical oil pump O/P (or an electric oil pump EO/P that is driven by a pump motor) as a medium, in response to a command from the hybrid controller 21. The battery controller 25 controls the charging/discharging of the battery 12 in response to a command from the hybrid controller 21.

Figures 2A, 2B:
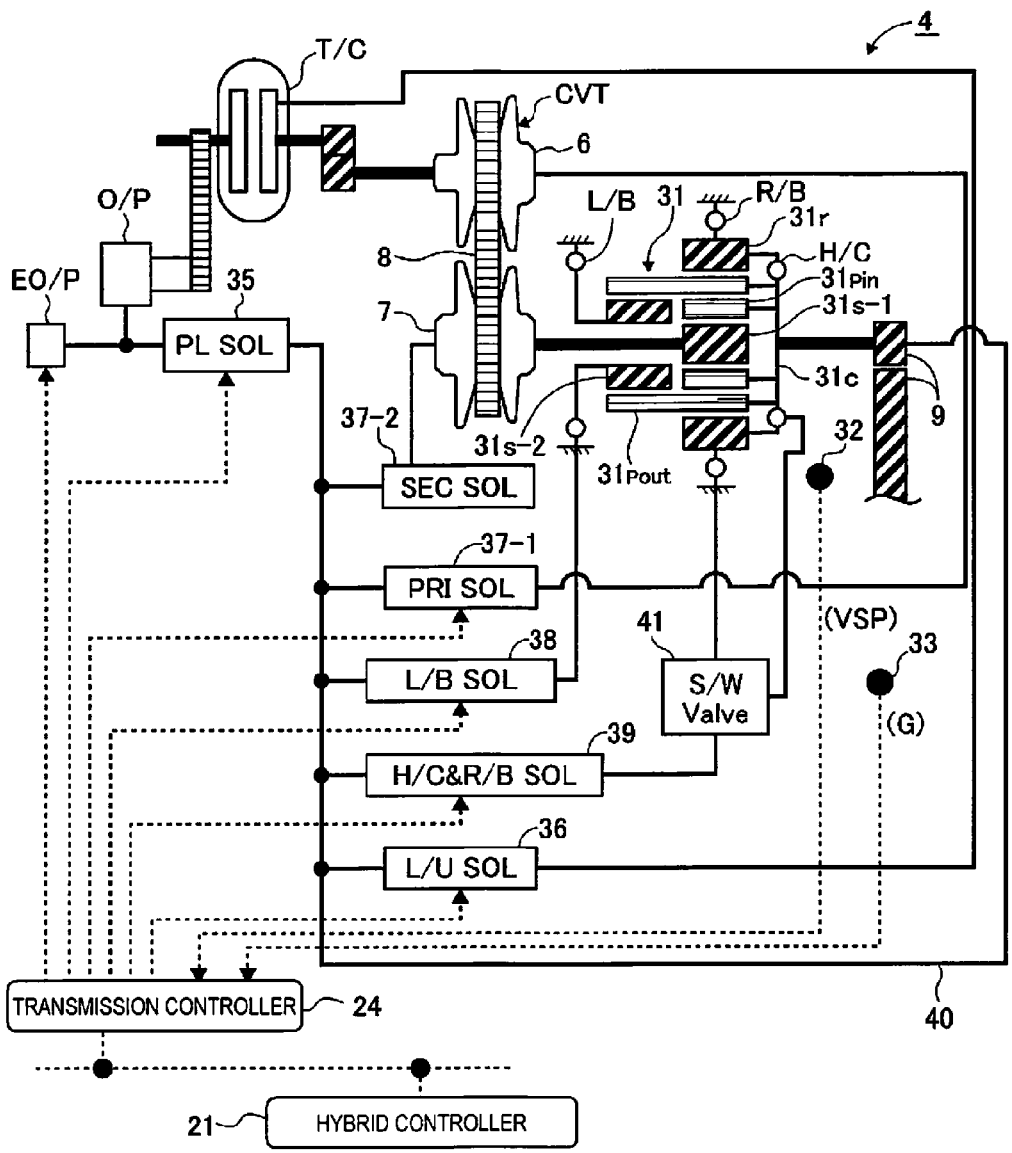
FIG. 2A is a schematic system view illustrating the drive system of the hybrid vehicle and the overall control system thereof in accordance with the first embodiment.
FIG. 2B is a clutch engagement logic diagram in a sub-transmission that is built into a V-belt type continuously variable transmission in a drive system of the hybrid vehicle in accordance with the first embodiment.

FIG. 2A is a schematic system view illustrating the drive system of the hybrid vehicle of the first embodiment and the overall control system thereof. FIG. 2B is the clutch CL (specifically, H/C, R/B, L/B) engagement logic diagram in a sub-transmission 31 that is built into a continuously variable transmission 4 in a drive system of the hybrid vehicle of the first embodiment. The sub-transmission 31 is configured from a Ravigneaux planetary gear set, comprising compound sun gears 31s-1 and 31s-2, an inner pinion 31pin, an outer pinion 31pout, a ring gear 31r, and a carrier 31c that rotatably supports the pinions 31pin, 31pout, as illustrated in FIG. 2A.

Of the compound sun gears 31s-1 and 31s-2, the sun gear 31s-1 is coupled to the secondary pulley 7 so as to act as an input rotation member, and the sun gear 31s-2 is disposed coaxially with respect to the secondary pulley 7 so as to be freely rotatable.

The inner pinion 31pin meshes with the sun gear 31s-1, and this inner pinion 31pin and the sun gear 31s-2 each mesh with the outer pinion 31pout. The outer pinion 31pout meshes with the inner perimeter of the ring gear 31r, then couples with the final gear set 9 so as to cause the carrier 31c to act as an output rotation member. The carrier 31c and the ring gear 31r are configured to be appropriately connectable by the high clutch H/C, which is the clutch CL; the ring gear 31r is configured to be appropriately connectable by the reverse brake R/B, which is the clutch CL, and the sun gear 31s-2 is configured to be appropriately connectable by the low brake L/B, which is the clutch CL.

The sub-transmission 31 is capable of selecting the gear shift stages of forward first speed, second speed, and reverse by engaging the high clutch H/C, the reverse brake R/B, and the low brake LIB in a combination illustrated by the o mark in FIG. 2(b) and releasing the others as illustrated by the x mark in FIG. 2(b). If the high clutch H/C, the reverse brake R/B, and the low brake L/B are all released, the sub-transmission 31 is in a neutral state that does not carry out power transmission. If the low brake L/B is engaged in this state, the sub-transmission 31 will be placed in a forward first speed selected (deceleration) state. If the high clutch H/C is engaged, the sub-transmission 31 will be in a forward second speed selected (direct connection) state; and if the reverse brake R/B is engaged, the sub-transmission 31 will be in a reverse selected (reverse) state.

The continuously variable transmission 4 in FIG. 2(a) is capable of detaching the variator CVT (secondary pulley 7) and the drive wheel 5 by releasing all of the clutches CL (H/C, R/B, L/B) to put the sub-transmission 31 in the neutral state.

The continuously variable transmission 4 in FIG. 2(a) is controlled with oil from an engine driven mechanical oil pump O/P or an electric oil pump EO/P that is driven by a pump motor as a working medium; the transmission controller 24 controls the transmission control of the variator CVT in the following manner via a line pressure solenoid 35, a lock-up solenoid 36, a primary pulley pressure solenoid 37-1, a secondary pulley pressure solenoid 37-2, a low brake pressure solenoid 38, a high clutch pressure and reverse brake pressure solenoid 39, and a switch valve 41. In addition to the signals described above for FIG. 1, a signal from a vehicle speed sensor 32 that detects the vehicle speed VSP and a signal from an acceleration sensor 33 that detects the vehicle acceleration/deceleration G are input into the transmission controller 24.

The line pressure solenoid 35 regulates the pressure of the oil from the mechanical oil pump O/P to line pressure PL, which corresponds to the required drive force of the vehicle, in response to a command from the transmission controller 24. Additionally, an electric oil pump EO/P is connected between the mechanical oil pump O/P and the line pressure solenoid 35, which supplies pump discharge pressure in response to a command from the transmission controller 24.

The lock-up solenoid 36 places the torque converter T/C in a lock-up state in which the input/output elements are directly connected when required by appropriately directing the line pressure PL to the torque converter T/C in response to a lock-up command from the transmission controller 24.

The primary pulley pressure solenoid 37-1 regulates the line pressure PL to the primary pulley pressure in response to a CVT transmission ratio command from the transmission controller 24 and supplies same to the primary pulley 6, thereby fulfilling the CVT transmission ratio command from the transmission controller 24 by controlling the V-groove width of the primary pulley 6 and the V-groove width of the secondary pulley 7 so that the CVT transmission ratio matches the command from the transmission controller 24. The secondary pulley pressure solenoid 37-2 regulates the line pressure PL to the secondary pulley pressure in response to a clamping force command from the transmission controller 24 and supplies same to the secondary pulley 7; the secondary pulley 7 thereby clamps the V-belt 8 to prevent slipping. When the transmission controller 24 is emitting a first speed selection command of the sub-transmission 31, the low brake pressure solenoid 38 supplies the line pressure PL to the low brake L/B as the low brake pressure and engages same in order to fulfill the first speed selection command. When the transmission controller 24 is emitting a second speed selection command or the reverse selection command of the sub-transmission 31, the high clutch pressure and reverse brake pressure solenoid 39 supplies the line pressure PL to the switch valve 41 as the high clutch pressure and reverse brake pressure. The maximum discharge capacity of the electric oil pump EO/P of the first embodiment is set to be smaller than that of the mechanical oil pump O/P in order to realize a downsizing of the motor and the pump of the electric oil pump EO/P.

At the time of the second speed selection command, the second speed selection command of the sub-transmission 31 is realized with the switch valve 41 directing the line pressure PL from the solenoid 39 to the high clutch H/C as the high clutch pressure and engaging same. At the time of the reverse selection command, the reverse selection command of the sub-transmission 31 is realized with the switch valve 41 directing the line pressure PL from the solenoid 39 to the reverse brake R/B as the reverse brake pressure and engaging same.

The transmission control process will now be explained. The transmission controller 24 controls the continuously variable transmission 4 according to the travel state of the vehicle (the vehicle speed VSP, primary rotational speed Npri, and the accelerator pedal opening amount APO in the first embodiment) with reference to a shift map that is set in advance. A shift line is set for each accelerator pedal opening amount APO in this shift map in the same way as a shift map for a conventional belt type continuously variable transmission, and shifting of the continuously variable transmission 4 is carried out according to the shift line selected according to the accelerator pedal opening amount APO. A mode switching shift line for the shifting of the sub-transmission 31 is set on this shift map. Then, when the operating point of the continuously variable transmission 4 crosses the mode switching shift line, the transmission controller 24 carries out a coordinated shift with both the variator CVT and the sub-transmission 31 to switch between high speed mode-low speed mode.

Figure 3:
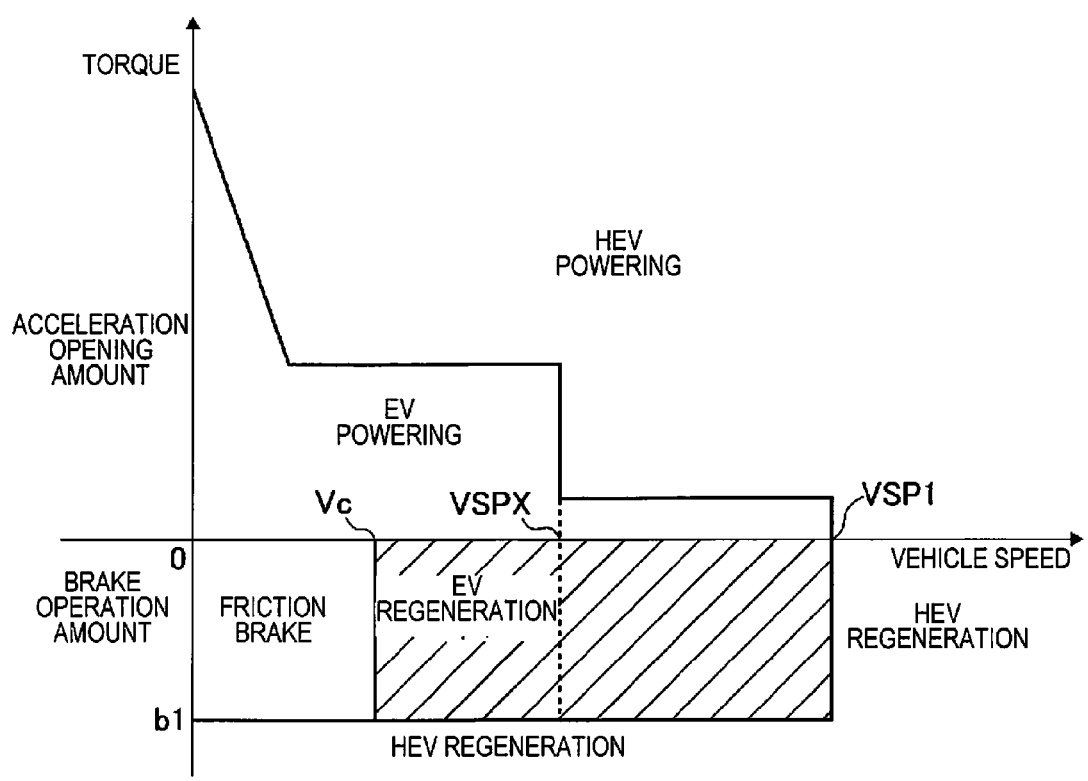
FIG. 3 is a mode map in which are set the traveling modes of the hybrid vehicle of the first embodiment.

FIG. 3 is a mode map in which are set the travel modes of the hybrid vehicle of the first embodiment. In the mode map of FIG. 3, the travel mode is set according to the accelerator pedal opening amount when above 0 of the vertical axis, and set according to the ON/OFF state of the brake switch 26 when below 0. In the EV powering region, in which the accelerator pedal 19 is depressed, a powering region is set by the EV mode up to the powering vehicle speed VSPX. In addition, in a region representing a state in which the accelerator pedal 19 is slightly depressed (for example, an accelerator pedal opening amount that is somewhat less than 1/8), a powering region is set by the EV mode up to a predetermined vehicle speed VSP1, which is a higher vehicle speed than the powering vehicle speed VSPX. A region that is less than or equal to this predetermined vehicle speed VSP1 is almost never selected in a state in which the accelerator pedal 19 is depressed. On the other hand, when the accelerator pedal 19 is released during travel by the HEV mode to transition to coasting (inertial) travel, or when the brake pedal 16 is depressed from a powering state by the HEV mode to brake the vehicle, improved energy efficiency is realized by converting the kinetic energy of the vehicle to electric power with regenerative braking by the electric motor 2, and storing the electrical power in the battery 12 (HEV regeneration state). Additionally, when the braking torque is higher than a predetermined value b1, it is determined that there would be insufficient braking force with regenerative braking by only the electric motor 2, and the vehicle is placed in the HEV regeneration state. Frictional braking is thereby used in combination to secure the braking torque. Even if the braking torque is less than the predetermined value b1, if the vehicle speed is less than or equal to a predetermined vehicle speed Vc, it is switched from the EV regeneration state to frictional braking. This is because it is undesirable to generate a high regenerative torque when the electric motor 2 has a low rotational speed.

When performing regenerative braking while in the HEV mode (HEV regeneration state), since the clutch CL is in an engaged state, the regenerative braking energy is reduced by the amount of the reverse drive force of the engine 1 (engine braking) and the amount of the friction of the continuously variable transmission 4, so that the energy regeneration efficiency is poor. Accordingly, regenerative braking is started during travel by the HEV mode, and when the vehicle speed falls below the predetermined vehicle speed VSP1, the engine 1 and the variator CVT are detached from the drive wheel 5 by releasing the clutch CL to transition to travel in the EV mode. The vehicle is thereby placed in an EV regeneration state, and the friction from the engine 1 and the continuously variable transmission 4 is reduced so that a corresponding amount of energy regeneration can be gained. Additionally, during travel in EV mode, from the standpoint of fuel efficiency, the engine 1 is stopped by preventing the restarting of the injection of fuel to the engine 1 (fuel recovery), so that the cessation of the injection of fuel to the engine 1 which was executed during coasting travel (fuel cutting) is continued even after release of the clutch CL.

Problems that accompany transmission control when transitioning from HEV mode to EV mode will now be described. When a transmission ratio control of the continuously variable transmission is not carried out at all during EV mode, the transmission ratio during EV mode becomes the transmission ratio in HEV mode immediately before the switch to EV mode. Therefore, if the transmission ratio in HEV mode immediately before the switch to EV mode is a High-side transmission ratio, the transmission ratio during EV mode will also be a High-side transmission ratio; therefore, if the vehicle is stopped in this state, the transmission ratio while the vehicle is stopped is also a High-side transmission ratio. If starting in the HEV mode is initiated at this time based on a restart request, since the transmission ratio is a High-side transmission ratio and the engine torque is transmitted to the drive wheel after being reduced by the transmission, there is the problem that the drive force required by the driver cannot be met. In particular, when attempting to start a vehicle that is stopped on a steep uphill road with a transmission ratio in the vicinity of the Highest side, there is the problem that the drive force that is transmitted to the drive wheel 5 will fall below the travel resistance, so that an uphill start cannot be carried out. Therefore, in the first embodiment, when it is determined that the vehicle is on an uphill road while traveling in the EV mode, the engine is started and the continuously variable transmission is forcibly downshifted to a transmission ratio with which it is possible to start on an uphill road.

Figure 4:
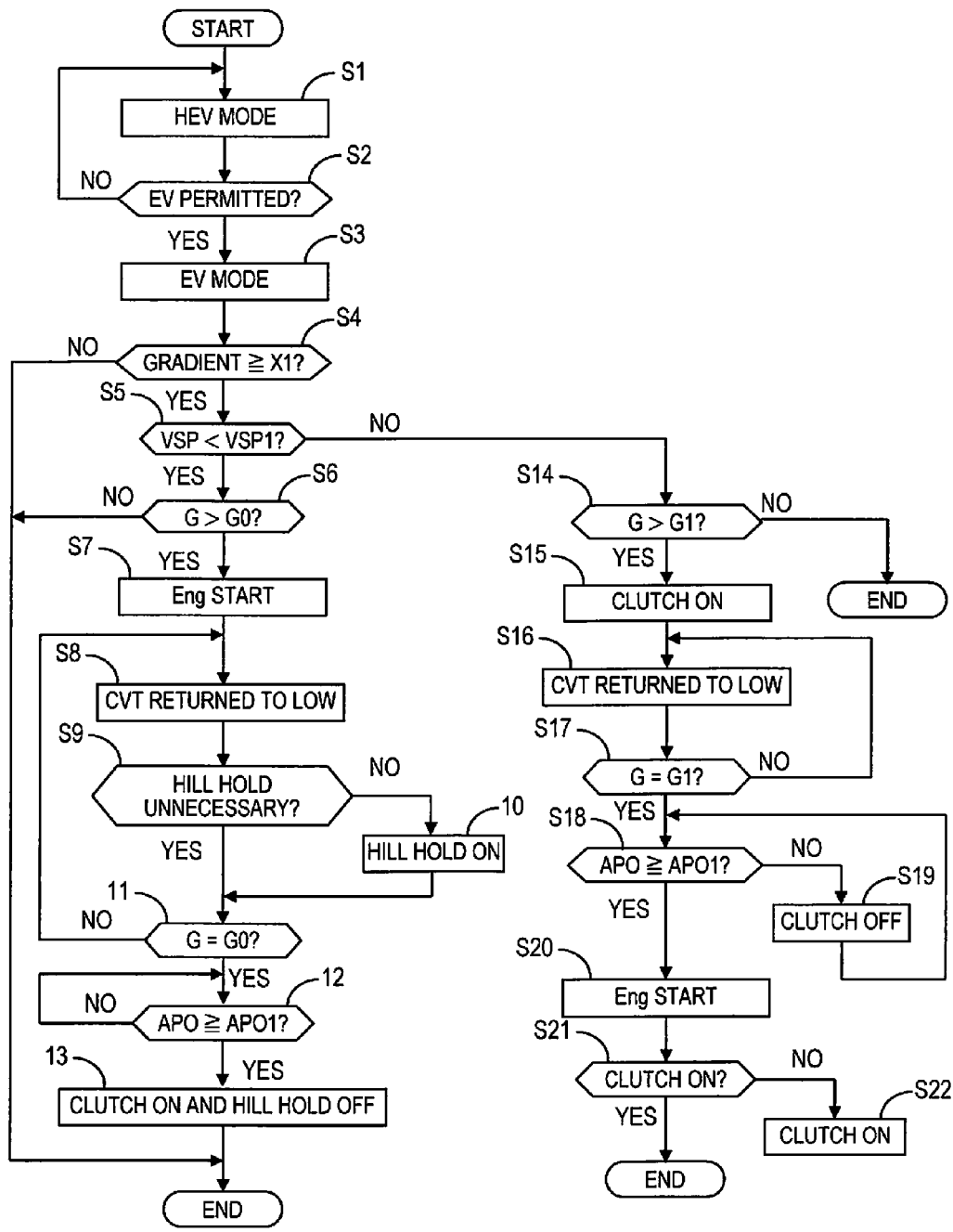
FIG. 4 is a flowchart illustrating a forced downshift control process in the EV mode of the first embodiment.

FIG. 4 is a flowchart illustrating a forced downshift control process in the EV mode of the first embodiment. In Step S1, the HEV mode is selected.

In Step S2, it is determined whether or not a mode transition from the HEV mode to the EV mode is permitted. If permitted, the process proceeds to Step S3, and if not, the HEV mode is continued. Specifically, it is determined whether or not an operating point, which is defined by the vehicle speed VSP and the accelerator position opening amount APO on the mode map of FIG. 3, is in the EV (powering/regeneration) region. If the operating point is in the EV region and other conditions are met, specifically conditions such as the battery state being greater than or equal to a predetermined state and the vehicle not being in a sudden braking state, a mode transition to the EV mode is permitted.

In Step S3, a mode transition to the EV mode is carried out. Specifically, the clutch CL is released, fuel injection to the engine 1 is stopped, and travel is executed by the torque of the electric motor 2.

In Step S4, it is determined whether or not the road surface gradient is greater than or equal to a predetermined value x1. If the road surface gradient is greater than or equal to the predetermined value x1, the process proceeds to Step S5. Otherwise, the present set of control steps is ended. The present step corresponds to an uphill road determination means, in which an uphill road is determined if the road surface gradient is greater than or equal to the predetermined value x1. Here, the road surface gradient is inferred on the basis of the deviation between an inferred acceleration that should be obtained during travel on a flat road by the torque of the electric motor 2 and the actual acceleration that is detected by an acceleration sensor 33. When the actual acceleration is less than the inferred acceleration, larger values for the road surface gradient are computed as the deviation increases. Other means of inference can be used to infer the gradient without any particular limitation.

In Step S5, it is determined whether or not the vehicle speed VSP is less than a predetermined vehicle speed VSP1. If it is determined to be less than the predetermined vehicle speed VSP1, the process proceeds to Step S6, and if it is determined to be greater than or equal to the predetermined vehicle speed VSP1, the process proceeds to Step S14. Here, a predetermined vehicle speed VSP1 is a value with which it is possible to determine that the vehicle is stopped, as well as a vehicle speed at which the forced downshift by the engagement of the clutch CL, as described below, is possible, and a vehicle speed at which the variator CVT can be downshifted to the transmission ratio G1 with which it is possible to start on an uphill road, as described below.

In Step S6, it is determined whether or not the actual gear ratio G of the variator CVT is on the Higher side of a transmission ratio G0 with which it is possible to start on an uphill road. If on the High-side, the process proceeds to Step S7, and if on the Low side, that is less than or equal to the transmission ratio G0 with which it is possible to start on an uphill road, the present set of control steps is ended. It is thereby not necessary to carry out an unnecessary downshift control, and it becomes possible to avoid deterioration of fuel consumption accompanying an engine restart, and the like. Here, the transmission ratio G0 with which it is possible to start on an uphill road is the lowest transmission ratio or a transmission ratio that is on the Higher side of the lowest transmission ratio and in the vicinity of the lowest transmission ratio with which it is possible to climb the steepest hill. Therefore, if a downshift to the transmission ratio G0 with which it is possible to start on an uphill road is completed, it becomes possible to start stably on any conceivable uphill road.

In Step S7, the engine 1 is started by the starter motor 3.

In Step S8, a forced downshift of the variator CVT toward the transmission ratio G0 with which it is possible to start on an uphill road is executed. In other words, while the current travel mode is the EV mode and the transmission ratio of the variator CVT is not involved in the travel at the present moment, a downshift is forcibly executed. Meanwhile, it is necessary for the primary pulley 6 and the secondary pulley 7 to be rotating in order for the variator CVT to be shifted; therefore, the engine 1 is started in Step S7, and the variator CVT is rotated by the engine 1 while a downshift is carried out by a hydraulic control of each pulley. The hydraulic power source of the hydraulic control at this time can be supplied by the mechanical oil pump O/P.

In Step S9, it is determined whether or not a hill hold control is unnecessary. If unnecessary, the process proceeds to Step S11, and if necessary, the process proceeds to Step S10.

In Step S10, the hill hold control is turned ON. A hill hold control regulates the movement of the vehicle on an uphill road by sealing the brake fluid pressure inside the wheel cylinder until a torque is transmitted to the drive wheel 5 and it becomes possible for the vehicle to start, regardless of the operation of the brake pedal by the driver. If the hydraulic pressure inside the wheel cylinder is insufficient, the wheel cylinder may be pressurized by a brake actuator, such as a VDC control unit interposed between the master cylinder and the wheel cylinder, without any particular limitation.

In Step S11, it is determined whether or not the transmission ratio G of the variator CVT has reached the transmission ratio G0 with which it is possible to start on an uphill road. If reached, the process proceeds to Step S12. Otherwise, the process returns to Step S8 to continue the forced downshift.

In Step S12, it is determined whether or not the accelerator pedal opening amount APO is greater than or equal to a predetermined opening amount APO1. If greater than or equal to the predetermined opening amount APO1, the process proceeds to Step S13. Otherwise, the present Step S12 is repeated and the process stands by. Here, the predetermined opening amount APO1 is a predetermined value with which it is possible determine that there is a start request from the driver. Since the engine 1 is already in a started state, if the vehicle is stopped after an uphill road is determined, a state is maintained in which it is possible to start at any time by using the drive force of the engine 1. The starting performance on an uphill road can thereby be ensured.

In Step S13, the clutch CL is turned ON, that is, an engagement is started; and if a hill hold control is being carried out, the hill hold control is turned OFF and the vehicle is started.

In Step S14, it is determined whether or not the actual gear ratio G of the variator CVT is on the Higher side of a transmission ratio G1 with which it is possible to start on an uphill road. If on the high-side, the process proceeds to Step S7; and if on the Low side, that is less than or equal to the transmission ratio G1 with which it is possible to start on an uphill road, the present set of control steps is ended. It is thereby not necessary to carry out an unnecessary downshift control, and it becomes possible to avoid deterioration of fuel consumption accompanying an engine restart and the like. Here, the transmission ratio G1 with which it is possible to start on an uphill road is the lowest transmission ratio or a transmission ratio that is on the Higher side of the lowest transmission ratio and in the vicinity of the lowest transmission ratio with which it is possible to climb the steepest hill, in the same manner as the transmission ratio G0 with which it is possible to start on an uphill road. However, since the vehicle is traveling and the drive force corresponding to the inertia of the vehicle is not required, the transmission ratio may be set slightly on the Higher side of G0, or be set to a transmission ratio corresponding to the vehicle speed VSP. When a downshift to the transmission ratio G1 with which it is possible to start on an uphill road is thereby completed, it becomes possible to restart stably on any conceivable uphill road with an appropriate transmission ratio.

In Step S15, the clutch CL is turned ON.

In Step S16, a forced downshift of the variator CVT toward the transmission ratio G1 with which it is possible to start on an uphill road is executed. In other words, while the current travel mode is the EV mode and the transmission ratio of the variator CVT is not involved in the travel at the present moment, a downshift is forcibly executed. Meanwhile, it is necessary for the primary pulley 6 and the secondary pulley 7 to be rotating in order for the variator CVT to be shifted; therefore, the clutch CL is engaged in Step S15, and the variator CVT is rotated by the drive wheel 5 while a downshift is carried out by a hydraulic control of each pulley. The hydraulic power source of the hydraulic control at this time may be the mechanical oil pump O/P or be supplied by the electric oil pump EO/P, if necessary.

In Step S17, it is determined whether or not the transmission ratio G of the variator CVT has reached the transmission ratio G1 with which it is possible to start on an uphill road. If reached, the process proceeds to Step S18. Otherwise, the process returns to Step S19 to continue the forced downshift.

In Step S18, it is determined whether or not the accelerator pedal opening amount APO is greater than or equal to a predetermined opening amount APO1. If greater than or equal to the predetermined opening amount APO1, the process proceeds to Step S20. Otherwise, the process proceeds to the present Step S19.

In Step S19, the clutch CL is turned OFF and the process returns to Step S18. In particular, this is in order to avoid friction loss due to the turning of the variator CVT by releasing the clutch CL and to standby until a re-acceleration intent is detected, when a re-acceleration intent or the like is not detected.

In Step S20, the engine 1 is started. This is in order to secure the engine drive force by starting the engine 1, since the torque of only the electric motor 2 will be insufficient, when a re-acceleration intent is detected during travel in the EV mode on an uphill road.

In Step S21, it is determined whether or not the clutch CL is in an ON state. If the clutch is in the ON state, that is, if engaged, the present set of control steps is ended as is; and if the clutch is released, the process proceeds to Step S22 to turn the clutch CL ON, that is, the clutch is engaged in order to carry out a re-acceleration.

Figure 5:
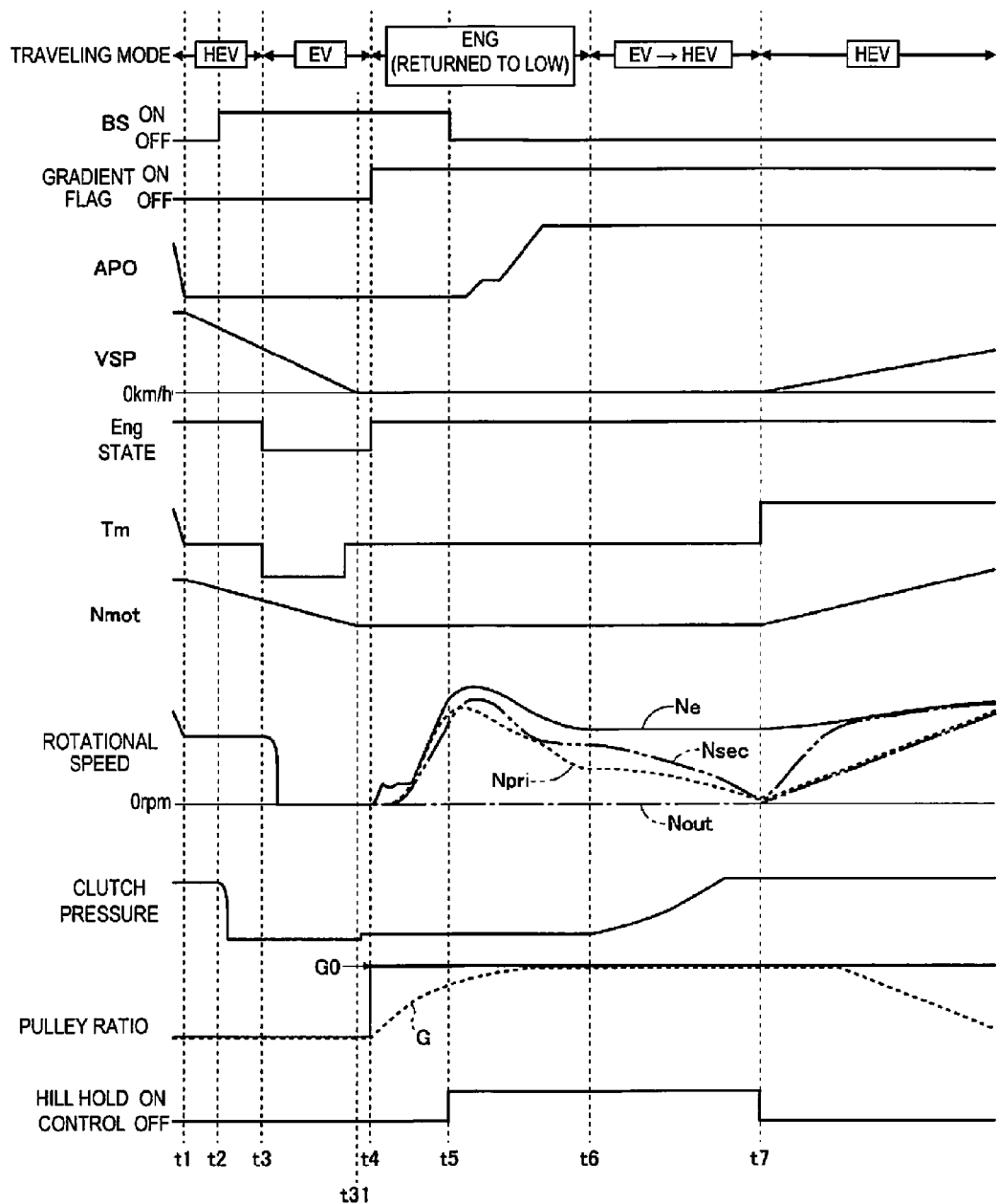
FIG. 5 is a time chart illustrating a forced downshift action by the engine in the first embodiment.

Next, the action based on the forced downshift control process when in the above-described EV mode will be described. FIG. 5 is a time chart illustrating a forced downshift action by the engine in the first embodiment. BS represents the ON-OFF state of the brake switch 26; the gradient flag represents the determination state by the uphill road determination of Step S4 (ON if on an uphill road. Otherwise OFF); Tm represents the motor torque of the electric motor 2; Ne represents the engine rotational speed; Nmot represents the motor rotational speed of the electric motor 2; Nout represents the driving wheel rotational speed; Npri represents the primary pulley rotational speed; and Nsec represents the secondary pulley rotational speed. In addition, the initial travel state is a state in which the accelerator pedal is beginning to be released in the HEV mode.

At time t1, when the accelerator pedal is fully released, APO becomes zero and the motor torque Tm also becomes zero, initiating a reduction of the vehicle speed VSP. As a result, the motor rotational speed Nmot also starts to decrease. At time t2, if the brake pedal is depressed, the clutch CL is released in preparation for carrying out regenerative braking. At time t3, when a mode transition from the HEV mode to the EV mode is permitted, the injection of fuel to the engine 1 is stopped and the motor torque Tm generates regenerative torque. When regenerative braking by the electric motor 2 is carried out to reach a predetermined vehicle speed Vc, it is switched to braking by frictional braking in the subsequent low vehicle speed region; therefore, the regenerative torque becomes zero.

If the vehicle is stopped at time t31 and it is subsequently determined that the vehicle is on an uphill road at time t4, the gradient flag is turned ON and the engine 1 is started. The transmission ratio G0 with which it is possible to start on an uphill road is thereby set as the target transmission ratio, the primary pulley rotational speed Npri and the secondary pulley rotational speed Nsec are increased in accordance with an increase in the engine rotational speed, and the transmission ratio G also starts shifting toward the transmission ratio G0 with which it is possible to start on an uphill road. When the brake pedal is turned OFF following a change from stepping off of the brake pedal to stepping on the accelerator pedal at time t5, a hill hold request is turned ON, and the backward movement of the vehicle is suppressed. Hill hold control is then continued until the accelerator pedal is depressed and it becomes possible to start.

At time t6, if it is determined that the transmission ratio G of the variator CVT has reached the transmission ratio G0 with which it is possible to start on an uphill road, the engagement of the clutch CL is started. In other words, the engagement of the clutch CL is prohibited until the transmission ratio G reaches the transmission ratio G0 with which it is possible to start on an uphill road. Therefore, there will be no request to stop the shifting that accompanies the engagement of the clutch CL while the vehicle is in a state in which sufficient starting performance is not secured. When the engagement of the clutch CL moves forward, the primary pulley rotational speed Npri and the secondary pulley rotational speed Nsec both approach the drive wheel rotational speed Nout (=0). Since the differential rotation with the engine rotational speed Ne at this time is absorbed by the torque converter T/C, a torque amplifying action is obtained. At time t7, when it is determined that the engagement of the clutch CL is completed, both the engine torque and the motor torque are output, and the vehicle is started. At this time, since the variator CVT is shifted to the transmission ratio G0 with which it is possible to start on an uphill road, it becomes possible to start while sufficiently utilizing the engine torque and a smooth start is possible even on an uphill road.

Figure 6:
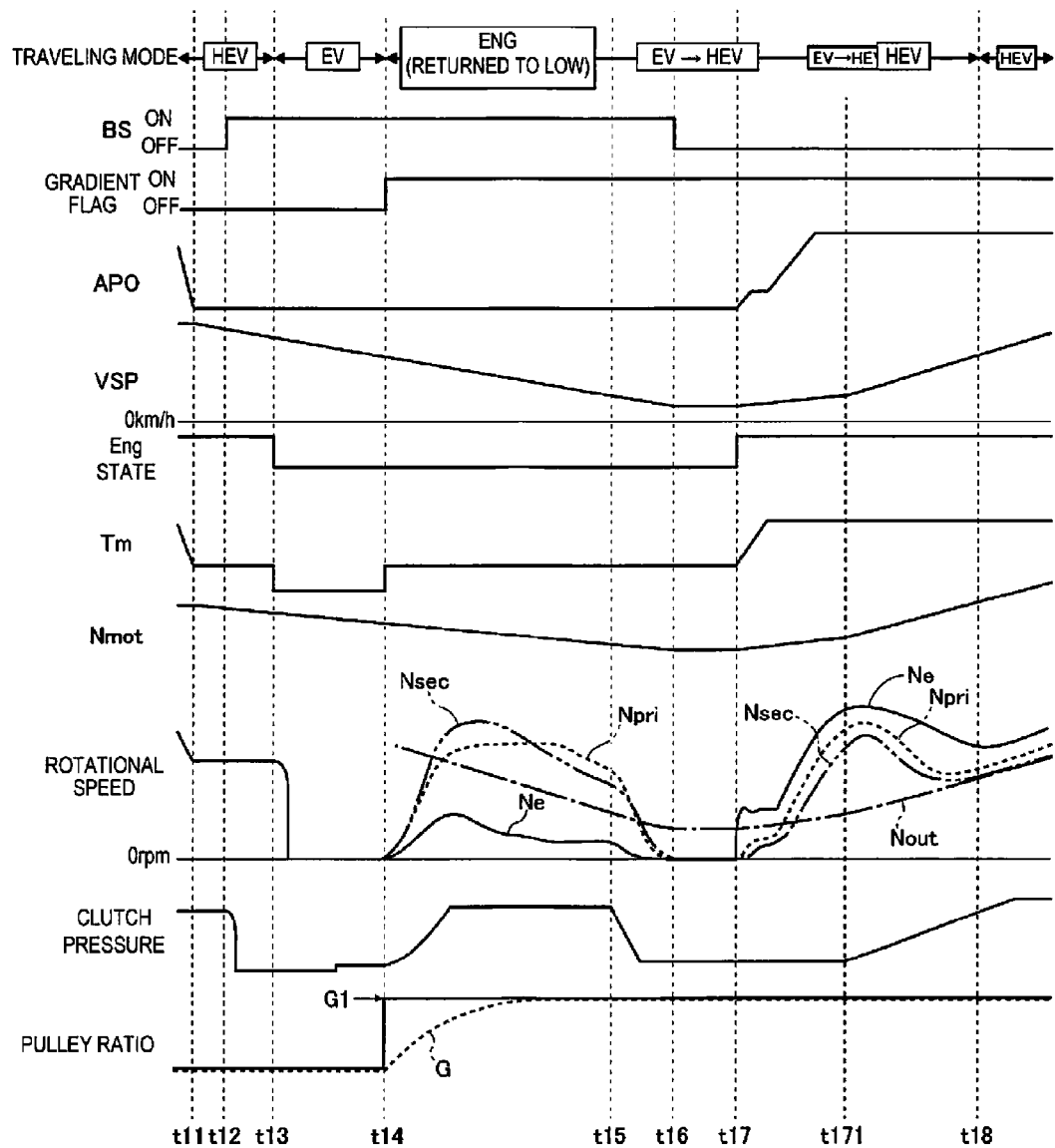
FIG. 6 is a time chart illustrating a forced downshift action by the clutch in the first embodiment.

FIG. 6 is a time chart illustrating a forced downshift action by the clutch in the first embodiment. The initial travel state is a state in which the accelerator pedal is beginning to be released in the HEV mode. At time t11, when the accelerator pedal is fully released, APO becomes zero and the motor torque Tm also becomes zero, initiating a reduction of the vehicle speed VSP. As a result, the motor rotational speed Nmot also starts to decrease. At time t12, if the brake pedal is depressed, the clutch CL is released as a preparation for carrying out regenerative braking. At time t13, when a mode transition from the HEV mode to the EV mode is permitted, the fuel injection of the engine 1 is stopped and the motor torque Tm generates regenerative torque.

At time t14, if it is determined that the vehicle speed VSP is greater than or equal to VSP1 and that the vehicle is on an uphill road, it is determined that the vehicle is traveling on an uphill road; the gradient flag is then turned ON and the engagement of the clutch CL is started. The primary pulley rotational speed Npri and the secondary pulley rotational speed Nsec are thereby increased by the rotational speed of the drive wheel 5, and the transmission ratio G also starts shifting toward the transmission ratio G1 with which it is possible to start on an uphill road. In the initial stage of the engagement of the clutch CL, the secondary pulley rotational speed Nsec is higher than the primary pulley rotational speed Npri, since the pulley ratio is a high transmission ratio; however, in the later stage, when the engagement of the clutch CL is ended, the primary pulley rotational speed Npri becomes higher than the secondary pulley rotational speed Nsec as the transmission ratio approaches the transmission ratio G1 with which it is possible to start on an uphill road. Since torque loss occurs, due to the presence of friction that accompanies an increase in the rotational speed of the variator CVT, etc., the regenerative torque by the electric motor 2 is set to zero and a necessary braking force is applied by frictional braking.

At time t15, if it is determined that the transmission ratio G of the variator CVT has reached the transmission ratio G1 with which it is possible to start on an uphill road, the clutch CL is released, since the EV mode is currently selected. Accordingly, the rotational speeds of the engine rotational speed Ne, the primary pulley rotational speed Npri, and the secondary pulley rotational speed Nsec will all be reduced. At time t16, if the driver switches from an intent to decelerate to an intent to accelerate (change of mind), and the brake pedal is released following a change from depression of the brake pedal to depression of the accelerator pedal, the vehicle is placed in a coasting travel state. If the accelerator pedal is depressed at time t17, the engine 1 is started. Accordingly, the engine rotational speed Ne is raised, the primary pulley rotational speed Npri and the secondary pulley rotational speed Nsec are raised via the torque converter T/C, and both the engine torque and the motor torque are output. Since the clutch CL has not yet been engaged, the engine torque is not transmitted to the drive wheel 5, and the vehicle starts a gradual acceleration by only the motor torque. If the engagement of the clutch CL is started at time t171, the engine torque is transmitted to the drive wheel 5 and the vehicle is further accelerated. At this time, since the variator CVT is shifted to the transmission ratio G1 with which it is possible to start on an uphill road, it becomes possible to restart while sufficiently utilizing the engine torque, so that a smooth acceleration is possible even on an uphill road. When the engagement of the clutch CL is completed at time t18, travel in normal HEV mode is carried out by the transmission ratio G1 with which it is possible to start on an uphill road.

As described in the foregoing, the effects listed below can be obtained with the first embodiment.

(1) The hybrid vehicle control device comprising the engine 1, the variator CVT (continuously variable transmission 4) that is coupled to an output shaft of the engine 1, the clutch that is coupled to an output shaft of the variator CVT, the drive wheel 5 that is coupled to an output shaft of the clutch, the electric motor 2 that is coupled to the drive wheel 5, and the hybrid controller 21 (control means) that controls outputs of the engine 1 and the electric motor 2, the engagement and disengagement of the clutch, and the transmission ratio of a continuously variable transmission 4, in accordance with the driving state, wherein a Step S4 (uphill road determination means) for determining whether or not a vehicle is on an uphill road is provided, and upon determining that the vehicle is on an uphill road while in an EV mode (electric vehicle mode) in which it is possible to travel by the drive force of the electric motor 2 with the clutch CL released and the engine 1 stopped, the hybrid controller 21 starts the engine 1 and forcibly downshifts the variator CVT to a predetermined transmission ratio G0 with which it is possible to start on an uphill road. Therefore, even when the vehicle is switched to the HEV mode in which the engine 1 is used to travel on an uphill road while in the EV mode, since the transmission ratio of the variator CVT is downshifted to the transmission ratio G0 with which it is possible to start on an uphill road, it becomes possible to transmit sufficient drive force from the engine 1 to the drive wheel for stable travel.

(2) The hybrid vehicle control device, wherein upon determining that the vehicle is on an uphill road during travel in EV mode, the hybrid controller 21 engages the clutch CL and downshifts the variator CVT to a transmission ratio G1 with which it is possible to start on an uphill road. Therefore, it becomes possible to downshift the variator CVT to the transmission ratio G1 with which it is possible to start on an uphill road without restarting the engine 1, and to improve the fuel efficiency. In addition, even when a re-acceleration request is made due to a change of mind, and the mode is switched to the HEV mode, in which the engine 1 is used for travel while traveling on an uphill road in EV mode, since the transmission ratio of the variator CVT is downshifted to the transmission ratio G0 with which it is possible to start on an uphill road, it becomes possible to transmit sufficient drive force from the engine 1 to the drive wheel for stable travel.

(3) The vehicle control device, wherein, when the driver requests a start during a forced downshift, the hybrid controller 21 engages the clutch CL and starts the vehicle after the completion of the forced downshift. That is, if the clutch CL is engaged during a forced downshift because of a start request from the driver, the vehicle will be started in a state in which the variator CVT is on the Higher side of the transmission ratio G0 with which it is possible to start on an uphill road; therefore, there is a risk that the vehicle cannot be started. Deterioration of the starting performance that accompanies a clutch engagement during a forced downshift can thereby be avoided by prioritizing the forced downshift.

(4) The vehicle control device, wherein the hybrid controller 21 prohibits a forced downshift when the transmission ratio of the variator CVT is on the lower side of the transmission ratio G0, or G1, with which it is possible to start on an uphill road. It is thereby not necessary to carry out an unnecessary downshift control, and it becomes possible to avoid deterioration of fuel consumption accompanying an engine restart, and the like.

The present invention was described above based on an embodiment, but the invention is not limited to the configurations described above, and other configurations are included in the present invention. A configuration was shown in the embodiment in which the engine is restarted with a starter motor 3, but other configurations are also possible. Specifically, in recent years, a technology has been put into practical use, in which the alternator is replaced with a motor generator in a vehicle with an idling stop function; an alternator function is added to this motor generator to add an engine starting function; thus, engine restarting is carried out when the engine is restarted from an idling stop with this motor generator rather than the starter motor. The present invention may be configured so that engine restart is carried out by a motor generator described above.

In addition, in the embodiments, regarding determinations in the mode map, the negative region of the vertical axis was determined based on the ON or OFF of the brake switch 26, but the invention is not limited thereto; the determination may be based on an output value of a stroke sensor of the brake pedal 16, or the determination may be based on the output value of a brake fluid pressure sensor that detects the pressure of the master cylinder, etc.

The invention claimed is:

1. A hybrid vehicle control device comprising:
   an engine;
   a continuously variable transmission coupled to an output shaft of the engine;
   a clutch coupled to an output shaft of the continuously variable transmission;
   a drive wheel coupled to an output shaft of the clutch;
   an electric motor coupled to the drive wheel; and
   at least one controller programmed to control outputs of the engine and the electric motor, an engagement and disengagement of the clutch, and a transmission ratio of the continuously variable transmission in accordance with a driving state,
   the at least one controller being further programmed to determine whether or not a vehicle is on an uphill road, and
   the at least one controller being further programmed to start the engine and forcibly downshift the continuously variable transmission to a predetermined transmission ratio for starting on an uphill road upon determining that the vehicle is on the uphill road while in an electric vehicle mode for traveling by a drive force of the motor with the clutch released and the engine stopped.

2. The hybrid vehicle control device according to claim 1, wherein
   the at least one controller is further programmed to engage the clutch and downshift the continuously variable transmission to a transmission ratio with which it is possible to start on an uphill road upon determining that the vehicle is on the uphill road while traveling in the electric vehicle mode.

3. The hybrid vehicle control device according to claim 1, wherein
the at least one controller is further programmed to engage the clutch and start the vehicle after completion of the forced downshift upon receiving a driver request to start during the forced downshift.

4. The hybrid vehicle control device according to claim 1, wherein
the at least one controller is further programmed to prohibit the forced downshift upon determining the transmission ratio of the continuously variable transmission is on a lower side of the predetermined transmission ratio for starting on an uphill road.

5. The hybrid vehicle control device according to claim 2, wherein
the at least one controller is further programmed to prohibit the forced downshift upon determining the transmission ratio of the continuously variable transmission is on a lower side of the predetermined transmission ratio for starting on an uphill road.

6. The hybrid vehicle control device according to claim 3, wherein
the at least one controller is further programmed to prohibit the forced downshift upon determining the transmission ratio of the continuously variable transmission is on a lower side of the predetermined transmission ratio for starting on an uphill road.

7. A hybrid vehicle control device comprising:
an engine;
a continuously variable transmission coupled to an output shaft of the engine;
a clutch coupled to an output shaft of the continuously variable transmission;
a drive wheel coupled to an output shaft of the clutch;
an electric motor coupled to the drive wheel, the continuously variable transmission being located upstream of the clutch with respect to the drive wheel; and
at least one controller programmed to control outputs of the engine and the electric motor, an engagement and disengagement of the clutch, and a transmission ratio of the continuously variable transmission in accordance with a driving state,
the at least one controller being further programmed to determine whether or not a vehicle is on an uphill road, and
the at least one controller being further programmed to start the engine and forcibly downshift the continuously variable transmission to a predetermined transmission ratio for starting on an uphill road upon determining that the vehicle is on the uphill road while in an electric vehicle mode for traveling by a drive force of the motor with the clutch released and the engine stopped.

8. A hybrid vehicle control device comprising:
an engine;
a continuously variable transmission coupled to an output shaft of the engine;
a clutch coupled to an output shaft of the continuously variable transmission;
a drive wheel coupled to an output shaft of the clutch;
an electric motor coupled to the drive wheel; and
at least one controller programmed to control outputs of the engine and the electric motor, an engagement and disengagement of the clutch, and a transmission ratio of the continuously variable transmission in accordance with a driving state,
the at least one controller being further programmed to determine whether or not a vehicle is on an uphill road, and
the at least one controller being further programmed to start the engine and forcibly downshift the continuously variable transmission to a predetermined transmission ratio for starting on an uphill road upon determining that the vehicle is on the uphill road while in an electric vehicle mode for traveling by a drive force of the motor with the clutch released and the engine stopped, the continuously variable transmission being downshifted by one of rotating the drive wheel with the clutch engaged and rotating the engine with the clutch disengaged.

* * * * *